Patented Feb. 16, 1943

2,311,200

UNITED STATES PATENT OFFICE 2,311,200

MANUFACTURE OF MODIFIED ROSIN

László Auer, East Orange, N. J.

No Drawing. Application April 1, 1941, Serial No. 386,371. In Hungary May 19, 1926

12 Claims. (Cl. 260—106)

This invention relates to the manufacture of modified organic isocolloids and it comprises processes of modifying organic isocolloids, particularly natural resins and other resinous organic isocolloids, with the aid of metal salts as the modifying agent, wherein a minor amount of a metal salt is dispersed or dissolved in the resin or other resinous organic isocolloid to produce the desired modification thereof, the mixture being advantageously heated under reduced pressure or in vacuo to facilitate the incorporation of the said modifying agent and the modification of the organic isocolloid, and it also comprises the modified resins and other modified organic isocolloids so obtained, said modified products being useful in making plastics and plastic and liquid coating compositions and containing an amount of modifying agent dispersed therein sufficient to substantially and advantageously modify their properties, and it further comprises plastic compositions and liquid coating compositions containing such modified organic isocolloid products, particularly those containing modified resin products; all as more fully hereinafter set forth and as claimed.

In my prior applications more fully identified post, I have described processes of modifying the properties of organic isocolloids, such as fatty oils, resins, etc. particularly their physical properties such as viscosity, melting point, solubility, etc. as well as other properties thereof. As stated in my prior applications, the modified organic isocolloid materials obtained by the processes described therein, are useful for various purposes; the modified products so obtained from fatty oils, resins, etc. being useful and advantageous in making varnishes, lacquers, and other liquid coating compositions, as well as in making plastic compositions.

The present invention also relates to such processes. And this application is directed to certain of the processes described in said prior applications, as hereinafter described; it being a continuation-in-part of my copending, prior applications as all more fully set forth post.

This application is a continuation-in-part of my copending, prior application Ser. No. 318,650, filed Feb. 12, 1940 (now Patent 2,298,270). That application is, in turn, a continuation-in-part of my prior application Ser. No. 143,786, filed Oct. 23, 1926 (now Patent No. 2,189,772) and of the various continuations thereof previously filed by me, particularly Ser. No. 359,425, filed April 30, 1929 (now Patent No. 2,213,944) and Serial No. 446,172, filed April 21, 1930 (now Patent No. 2,213,943; said Ser. No. 143,786 being the parent application of all said prior applications.

In my prior applications, listed ante, I have disclosed various methods of modifying organic isocolloid materials, such as fatty oils, resins, etc., using many different modifying agents. As there disclosed, my generic invention relates to processes for the modification of the physical properties of organic isocolloids and to the modified organic isocolloid products obtained. By the terms "organic isocolloids" and "organic isocolloid materials" I mean organic isocolloid substances wherein the dispersed phase and the dispersion medium of the colloidal system thereof are both of the same chemical composition but in a different state. That is, such organic isocolloids are mixtures of chemically similar organic carbon compounds wherein one or more of those compounds is dispersed or dissolved in the others, which serve as the dispersion medium of this isocolloid system.

As disclosed in my said prior applications, I have found that by dispersing or dissolving various modifying agents in fatty oils, resins and other organic isocolloid materials, I obtain new modified organic isocolloid products having altered properties which are useful in the commercial and industrial arts as shown therein. The modifying agents are employed in minor amounts and are organic or inorganic compounds which are electrolytes or polar compounds capable of influencing the modification of the isocolloid substances. In these applications many illustrative examples of the practice of my generic invention or discovery are disclosed.

The various modifying agents or polar compounds and the several procedures disclosed in said prior applications are useful in the practice of the present invention.

According to the present invention I treat natural and synthetic resins containing high molecular acids and obtain valuable modified resin products. And natural resins may be used with advantage in my present processes. Examples of such natural resins are: gum and wood rosins, copals (preferably premolten or fused), shellac, etc. Examples of the copal-type fossil gums are: East India gum, Manilla copal, Congo copal, kauri copal, etc. The copals should first be "fused" or "run," to obtain a reversibly fusible product, and then the fused or molten copal ("run" copal) treated according to the present invention.

Likewise, synthetic resins may be modified by the present processes. In fact, I have found that most synthetic resins are inherently organic isocolloids. That is, they are mixtures of chemically similar resinous compounds in which some of the resinous compounds are dissolved or dispersed in the remainder of the resinous mixture.

That is particularly true in synthetic resins produced by the polymerization of simple chemical compounds; some of the polymers being dissolved in other polymers. In general, this is also true of most resins made by reacting together two or more chemical compounds and resinifying the mixture. Any synthetic or artificial resinous material which is an organic isocolloid, particularly those containing acid resins, may be used in the practice of the present invention.

Thus, a wide variety of synthetic resins and artificial resinous materials may be employed in the present methods and useful modified products obtained. However, certain types of synthetic resins may be used with advantage in the practice of this invention.

As stated in my prior applications synthetic resins made from or containing natural resins, as a component thereof, are advantageous starting materials in the present processes. They, like the natural resins themselves, may be readily modified in accordance with my present invention.

The synthetic resins containing natural resins, such as rosin, etc., chemically combined in the resinous complex, give valuable modified resins by the present processes. For instance, the resinous esters obtained by esterifying natural resins with polyhydric alcohols are advantageous starting materials in this invention. The best known (and probably the simplest) of such resin esters is the so-called "ester gum." Commercially, ester gums are usually made by esterifying rosin with glycerine. Such ester gums or rosin glycerides are well known varnish resins and are widely used in making various varnishes. By the present invention, any of the commercial ester gums can be readily modified to improve their properties for such purposes.

Likewise, other resinous esters of glycerine and natural resins, such as copals, etc., may also be modified by my methods. Also, the resinous esters obtained by esterifying rosin, copals and other acid natural resins with other polyhydric alcohols, such as glycols, pentaerythritol, mannitol, sorbitol, etc., are useful as the starting material and give good modified resins.

In fact, I have found that resinous esters of polyhydric alcohols, generally, can be modified by my present processes. Those in which the polyhydric alcohol is esterified in part by a natural resin and in part by another acid, either mono- or di-basic acid, can be readily modified. For instance, the so-called "maleic resins" give advantageous modified resin products by my present processes. These "maleic resins" are resinous esters made by condensing and esterifying maleic anhydride, glycerine and rosin. Likewise, other resinous esters of polyhydric alcohols with dibasic acids (or anhydrides) and mono-basic acids, may be used as the starting material here. For example, the so-called "alkyd resins" can be readily modified by my present processes. Such resins have drying properties and are now widely used in making varnishes and other coating compositions. They may be made by esterifying glycerine with phthalic anhydride and a mono-basic acid capable of imparting drying properties to the resulting resin; the fatty acids of drying oils being usually employed as such mono-basic acid. However, sometimes rosin or other natural resin acids are used along or in conjunction with said fatty acids in making such resins. Likewise, in lieu of phthalic anhydride, other polybasic acids or their anhydrides are sometimes used, such as phthalic acid, adipic anhydride, sebacic anhydride, maleic anhydride and other dibasic acids and their anhydrides. Again, other polyhydric alcohols, such as those mentioned ante, are sometimes used in lieu of all or part of the glycerine. Further, such polyhydric alcohol-polybasic acid resin can be made in other ways than by direct esterification of the alcohol with the acids. However, irrespective of the way in which they are made, these resins are complex resinous esters of a polyhydric alcohol with a polybasic acid and a mono-basic acid capable of imparting drying properties to the resinous complex. Any and all of such resins can be modified by my present processes and good modified resin products obtained.

That is, in the practice of this invention, I may use synthetic resins made from or containing the acids of natural resins or of fatty oils or both such as the resinous esters mentioned ante.

Further, by the present invention, I can also modify other synthetic resins containing natural resins, including those containing the natural resin as such. For instance, the so-called "resin-modified" phenolics or "Albertols" can also be modified by my present processes to improve their properties. Such phenolic resins are phenol-aldehyde resins containing a sufficient amount of natural resins or of esters thereof, to alter their solubility and other properties. They are now used in making varnishes, particularly the phenol-formaldehyde resins containing rosin or other natural resins or their esters with polyhydric alcohols, such as glycerine. In my present invention, any of these phenolic resins can be advantageously modified with the aid of metal salts by my processes.

Thus in the practice of this invention, I can use a wide variety of resins, both natural and synthetic resins, and obtain a wide range of modified resin products useful in making plastic and liquid coating compositions.

In making such modified resin products by the present invention, the resin is modified by the aid of a minor amount of modifying agent according to the methods disclosed in my prior applications and the various modifying agents, such as metal salts etc. there disclosed may be employed. In fact, metal salts as a class are particularly useful in modifying resins by the present processes. And in the practice of the present invention, the various metal salts specifically mentioned in my prior applications are advantageous.

In other words, the present invention may be carried out in the same manner disclosed in any of my prior applications. And in modifying resins and resinous organic isocolloids by the present invention, the proportions of modifying agent and the temperatures, pressures, etc. disclosed in those applications may be used with advantage. That is, by selecting the modifying agent and the amount thereof and controlling the temperatures, pressures and other conditions in my present processes, advantageous modified resin products having the desired properties can be readily obtained, as shown in my prior applications.

As further shown in my prior applications, I modify the melting point, the viscosity, the solubility characteristics and other properties of the resin by my processes. In modifying the melting point of resins, I can produce either an increase or decrease in their melting point, as disclosed in my Serial No. 143,786 and the various continuations thereof mentioned ante. That is, a solidification or liquefaction of the resin can be obtained by my processes.

For instance, as disclosed in my Serial No. 143,786, soft to liquid resin products or modified resins of any intermediate stage of viscosity can be obtained from solid resins. Such methods for the liquefaction of resins are further described in my prior applications Ser. Nos. 359,425 and 318,650 and other continuations of said Ser. No. 143,786. In such processes, the melting point of the resin is decreased, hence they are liquefaction processes.

However, my invention is not limited to the manufacture of liquefied resin products. For instance, as disclosed in my Ser. No. 143,786, I can also increase the melting point and the viscosity of resins by my processes. As there stated in the case of resins which are solid at room temperature, the increase in viscosity is indicated by an increase in the point of fusion (melting point), as compared with that of the starting material. Such methods for the solidification of resins is further described in my prior applications Ser. Nos. 359,425 and 318,650 and other continuations of said Ser. No. 143,786. In such processes, the melting point of the resin is increased, hence they are solidification processes.

In other words, as shown in my prior applications, the melting point, viscosity and other physical properties of resins and other organic isocolloids can be modified by my processes. And in the case of resins, both the viscosity and melting point can be simultaneously modified with the aid of modifying agents as shown in said prior applications. Further, the modification of the melting point also simultaneously influences the viscosity of solutions of the modified resins in volatile solvents. Generally, the harder resins yield solutions having higher viscosities. Likewise, the softer resins yield solutions having lower viscosities. This is important in making liquid coating compositions.

That is, by my investigations I have found that viscosity and other properties of resins of the kind described, may be substantially illustrated, by modifying the physical colloidal structure of such resins, as disclosed in my prior applications.

And as further disclosed in those applications, the said alterations or modifications are effected by interaction between the resin substances and a minor amount of an electrolyte or polar compound as the modifying agent.

In the broad practice of this invention, the electrolyte or polar compound may be incorporated in the resinous substance in any suitable manner. Various methods for doing this are disclosed in my prior applications set forth ante and the methods there disclosed may be employed in my present processes.

In general, as described in my Serial No. 143,786, the electrolyte (modifying agent) and the raw or starting material (organic isocolloid) may be mixed cold or melted together or boiled, in the absence of or in the presence of various additional materials, as described and illustrated in that application and my other prior applications; the mixture usually being heated to facilitate the incorporation of the modifying agent and the modification of the starting material. In making modified resins by my present processes, it is advantageous to melt together or fuse the resin and the modifying agent into a homogeneous mass. That is, the modifying agent may be added to the solid resin, in the form of small pieces or a powder and the mixture heated to a temperature sufficient to fuse the resins to produce the desired modification. Again, the resin may be first melted by heating to a temperature sufficient to fuse the same and then gradually adding the modifying agent to the fused or molten resin; the heating being continued until the desired modification is obtained. In either case, the temperature should be sufficient to fuse the resin and produce a uniform homogeneous modified product.

In general, as disclosed in my prior applications Ser. Nos. 359,425 and 318,650, temperatures from 100 to 300° C. give satisfactory results in most cases. Most of the natural resins melt or fuse within this temperature range and can be readily modified by heating to temperatures sufficient to fuse or melt them in the presence of the modifying agent; the heating being continued until the desired modification is obtained. Only occasionally are temperatures above 300° C. necessary to produce satisfactory results. In such cases higher temperatures may be employed say as high as 350° C. if necessary. But in all cases, the temperature employed should not exceed that at which the modified resin decomposes. However, generally it is desirable to use lower temperatures; i. e., temperatures below 350° C. and this is possible in most cases. For instance, most synthetic resins are fusible or thermoplastic within the range given ante and may be modified in substantially the same way as natural resins. Of course, synthetic resins having lower melting points can be modified at lower temperatures. And in the case of synthetic resins which are liquid at room temperatures, the modifying agent can be incorporated by a simple mixing. That is, in some cases, the starting material and modifying agent can be mixed cold as stated in my Ser. No. 143,786. In such cases, the mixture can be subsequently heated to produce further modification of the resinous organic isocolloid.

In general, the temperatures employed in my present processes are below those at which the resultant modified resin decomposes and are sufficient to fuse or melt or otherwise blend the mixture into a uniform homogeneous modified product. And as stated ante, temperatures between 100 and 300° C. are advantageous in most cases and are usually employed in my present processes for producing modified resins.

That is, I have found that resins undergo colloidal transformations when heated with my modifying agents. I have further found that the most valuable modified resin products are obtained when my processes are carried out under reduced pressure, that is, under subatmospheric pressures or in vacuo.

As disclosed in my Serial No. 359,425, resins by liquefaction give substitutes for drying oils for use in oleo-resinous varnishes, paints, enamels and lacquers, since the liquefied resins have excellent drying properties.

As stated in Ser. No. 359,425, I find that the ease of modification varies with the natural origin of the resin; these resins being natural resins or gums, such as rosin, etc. As further disclosed in that application, I have found that of rosins, those of American, French and Spanish origin are more easily liquefied than the Greek rosins, though the latter undergo considerable improvement and become suitable for lacquer manufacture. The following modifying agents, among others, are eminently suitable and useful in the liquefaction of resins:

Ammonium iodide
Magnesium sulphate
Magnesium chloride
Magnesium carbonate
Barium thiocyanate
Zinc carbonate
Zinc bromide
Sodium sulphide
Lead chromate
Potassium dichromate
Barium sulphide
Cadmium sulphide The liquefaction is preferably carried out by heat treatment of the resin and modifying agent in vacuo. Usually the temperature employed is between 250° and 300° C. and temperatures of 270° to 290° are advantageous. The time required depends on the particular material used and on the liquefaction desired. Generally from 2 to 12 hours' heating will produce any desired liquefaction with most resins. Thus the conditions for modifying resins are generally similar to those used ante for modifying fatty oils. Likewise in modifying resins, I may also employ the "auxiliary agents" mentioned post. For instance, as disclosed in Ser. No. 359,425, addition of 5 per cent of formic acid to the mixture of resin and metal salt increases the velocity of dissolution of those modifying agents with consequent improvement of the resulting product. By such methods, I convert the natural resins which are hard and brittle, into modified resins which are non-brittle and have a lower fusion or melting point varying with the extent of the liquefaction. Generally these liquefied resins are plastic, soft resins. In some cases, they are viscous liquid gels, that is, heavy viscous liquids similar to very heavily bodied linseed oil. Thus, as stated in my Ser. No. 143,786, soft to liquid resins of any intermediate viscosity or hardness can be obtained from solid resins by my processes.

The present invention accordingly comprises a process wherein modification of the physical properties of unsaturated organic isocolloids consisting of or containing high molecular acids is effected by heating under sub-atmospheric pressure with modifying agents of the type described, characterized by the fact that the isocolloid to be modified is a resin (for example rosin).

The following examples illustrate the liquefaction of resins by my methods.

*Example 1*

300 parts of rosin (e. g. N-wood rosin) are heated with 30 parts of zinc carbonate and 5 parts of formic acid under a vacuum of 25-30 inches of mercury for 10-12 hours at 270-280° C.

The product so obtained is a very viscous oil which can be used in the varnish industry as a substitute for a drying oil, especially suitable for the manufacture of water-fast varnishes.

The addition of the formic acid serves to accelerate somewhat the dissolution of the modifying agent, as stated ante. Its use being optional as shown ante, the resin may be modified with the zinc carbonate alone, if desired. This is shown in the next example.

*Example 2*

100 parts of rosin and 5 parts of zinc carbonate are heated to between 280° and 290° C. in a 25-29 inch vacuum for 3 to 5 hours.

The modified resin so obtained is a plastic, soft resin having a so-called cold flow. It is useful in making varnishes and like compositions. Varnishes containing as part of the film-forming constituents have increased drying velocity and yield films having increased gloss. It is also useful in making printing inks. Further, it is useful in making lacquers, nitrocellulose and other cellulose ester compositions.

*Example 3*

To 100 parts of hard American rosin are added 8 parts of magnesium sulphate and 4 parts of formic acid and the mixture heated in a partial vacuum for a few hours, until upon cooling a viscous fluid modified resin is obtained.

In the above examples, the other salts mentioned ante as suitable for the liquefaction of resins may be used in lieu of those specified in Examples 1, 2 and 3 to obtain still other modified resins from natural resins such as gum rosin, wood rosin, copals, etc., by my methods.

Examples of some of the other metal salts which may replace magnesium sulphate in Example 3 are: magnesium chloride, ammonium sulphite, barium thiocyanate, and lead acetate, amongst others.

The latter mentioned modifying agents have much less liquefying action on rosin than magnesium sulphate, ammonium iodide or zinc carbonate. Even if the reaction conditions are not causing a marked decrease in melting point of the resins the modified resins may still show marked improvement as varnish bases. Another example of inorganic salt which causes profound lowering of melting point of rosin under vacuum besides zinc carbonate, ammonium iodide, magnesium sulphate and others, is lithium carbonate.

The different modifying agents yield somewhat different products with regard to color, viscosity (plasticity), and also when applied in protective coatings they differ in rate of drying, elasticity of the films and water and weather resistance of the coatings obtained.

Also, by these methods, I can modify synthetic resins containing said natural resins, such as ester gums, rosin modified phenolic or alkyd resins, etc., the ester gums and alkyd resins being esters of polyhydric alcohols with organic acids including fatty acids or resin acids or both, and being generally glycerin esters, they are organic isocolloids of a type somewhat analogous to the fatty oils, particularly heavily bodied fatty oils.

Likewise, in Examples 1, 2 and 3 and in similar embodiments of such methods, the amount of modifying agent (metal salt, etc.) may be varied, as disclosed in my prior Ser. No. 359,425; for instance, varied from say 2 to 10 per cent on the resin material being modified. In all cases, modified resins useful in making varnishes are obtained.

Thus as shown ante, I can produce modified products useful in making varnishes and lacquers from fatty oils or resins or both; and sometimes I use a mixture of fatty oil and resin (rosin, etc.) as the starting material and simultaneously modify both the fatty oil and resin by my methods.

In any of the methods described ante, metal salts may be employed with advantage, as illustrated ante. Further, as there shown, some metal salts have particular advantages. For instance, excellent varnish base materials can be obtained from resins with the aid of the following metal salts:

Magnesium sulphate
Sodium sulphide
Ammonium iodide
Magnesium carbonate
Zinc carbonate
Lead carbonate The last three of the above-mentioned salts are difficultly soluble in water. And the modified resin products made with these salts have superior properties. For instance the so-modified resin products are resistant to water and may be advantageously employed in making water-fast varnishes. Likewise, other salts which are insoluble or difficultly soluble in water may be advantageously employed as the modifying agent to obtain modified resins and varnishes having improved resistance to water. In the case of varnishes, the other constituents present therein also influence the fastness to water of the films obtained from such varnishes.

Improved results are obtained in some cases by passing a gas (for example sulphur dioxide, hydrogen sulphide or nitrogen) through the reaction mass during the process of colloidal transformation.

When fatty oils are added to the resins to be treated according to the present process, drying oils and semi-drying oils may be used in case paint and varnish raw materials are made by the processes. On the other hand, in case of lacquer raw materials, non-drying oils may be added to the resins. Also fatty oils, fatty acids, waxes, asphalt, asphalt oils, tars, tar oils, pitches and other similar products may be mixed with the resins before or during treatment according to the present process.

The products of the reaction vary in the case of any one definite starting material according to:

(a) Variations made in the nature of the modifying agent.
(b) The percentage of the modifying agent used.
(c) The duration of heating.
(d) The reaction temperature.
(e) The nature and physical state, pressure, of the gas present in the reaction chamber, etc.

The reaction may be further influenced by irradiation with short-wave oscillating energy, ultra-violet rays, X-rays, etc.

The modifying process may be accelerated, not only by radiations as mentioned in the prior specification, but also by making the mixture of starting material and electrolyte part of an electric circuit.

Likewise, I have found that the presence of air or other gases somewhat alters the results obtained. For instance, the products obtained by heating in the presence of air are somewhat different from those obtained when the mixture is heated in contact with other gases, such as carbon dioxide, nitrogen, hydrogen sulphide, sulphur dioxide, etc., or mixtures of gases. It may be stated with reference to the action of gases that generally speaking rarification of the gases present in the reaction chamber by the reduction in pressure tends to intensify their action in my processes.

In my present processes, I may employ a gas treatment in conjunction with the modifying action of the modifying compounds. The gas treatment may be carried out by blowing the gas through the reaction mixture or simply by passing it over the mass contained in the reaction chamber. For this purpose I may employ active or inert gases. In doing so, I find that $CO_2$, nitrogen, hydrogen sulphide and $SO_2$ are advantageous. Further, the gas may be produced in situ in the reaction mass by using substances which under the conditions of the reaction develop the desired gas, such, for instance, as carbonates, sulphides, sulphites and the like, all of which develop corresponding gases in the reaction mass.

Likewise, if desired, the modifying agent may be produced in situ within the mass under treatment.

The addition of a small amount, generally not more than 5 per cent on the weight of the starting material of auxiliary secondary purely organic metal-free reagents such as aldehydes, phenols, alcohols, ketones, hydrocarbons, etc., may have favorable results.

It is further possible to use the above described reagents, in combination with any modifying agent described in any one of the above mentioned specifications—e. g. with organic or inorganic acids, with salts, with organo-metallic compounds, with amino compounds, with compounds comprising within the molecule an acidic inorganic residue and an organic residue (viz. my application Ser. No. 359,425 and Ser. No. 318,650).

By an acidic inorganic residue, I mean such an inorganic residue as can be converted by the addition of one or more hydrogen atoms or by the addition of one or more molecules of water, and/or by the action of elevated temperatures into an inorganic acid (including carbonic acid as inorganic), leaving the organic residue behind. It will be seen from the above definition and from the illustrative compounds disclosed in my Serial No. 359,425, that this generic class of modifying agents includes such compounds as (1) organic halogen derivatives, (2) organic sulfonic acids and their halides and salts, including esters thereof, (3) esters of inorganic acids, (4) inorganic salts of organic bases and (5) organic nitro compounds, etc. Many examples illustrative of each of these classes are given in my said Ser. No. 359,425, (U. S. Patent 2,213,944). Some of the modifying agents specifically disclosed in that application are illustrative of other classes of modifying agents useful in my processes. That is, they contain a plurality of constituents, groups or radicals imparting polarity to such compounds.

As stated in prior specifications the application of an electric potential within the reaction mass influences favorably the reaction.

I have further discovered that the dissolution of the modifying agents in the starting materials may be appreciably facilitated by the addition of certain "auxiliary agents" or "sensitisers." These fall into two groups, namely, the purely inorganic (e. g., silica gel, fuller's earth), and the purely organic, e. g.:

Formaldehyde,
Phenol,
Thiocarbanilide,
Benzidine,
Hexamethylene-tetramine,
Alpha-naphthol,
Quinoline,
Pyrogallol,
Benzene,
Glycerol,
Phthalimide The specific examples of auxiliary agents here mentioned are to be taken as typical of the substances which have been successfully used for this purpose and not as comprising all the effective substances. It should be mentioned that some electrolytes, and quite a number of the modifying agents disclosed in prior specifications, and containing an acidic inorganic residue and an organic residue in the molecule, act as auxiliary agents (sensitizers) when used in conjunction with other modifying agents.

Thus, within the scope of the present invention, I may prepare my modified resins in various ways as shown ante. And in addition to the illustrative embodiments previously described, other embodiments may be used in the practice of my invention, in accordance with the description thereof given in this specification.

In modifying resins by the present invention, the physical and other properties of the resin are modified with the aid of metal salts and other modifying agents, as shown ante. The altered properties of the modified resins so obtained are due to complex, complicated changes in the resin system. Accordingly, the exact mechanism by which the modification is effected is not fully known.

However, some of those changes are undoubtedly colloidal in nature. For instance, the modification of the melting point and other physical properties of the resin in my processes involves a change in the gel structure of the resin; namely, a change in the iso-colloidal system. Such isocolloidal changes are in part responsible for the altered properties of my modified resins.

Again, apparently some chemical changes also occur during my processes. For one thing, I have found that the acid value of rosin and other acid resins is decreased when such resins are modified by my present processes. Thus, a portion of the resin acids may be neutralized or decarboxylated during such processing.

For instance, in modifying wood rosin according to the method described in Example 2, the acid value of the wood rosin drops from 165 to between 60–80; the modified rosin so obtained being less acid than the original wood rosin. Further in such processes, I have also discovered that $CO_2$ is simultaneously given off during the process. This indicates that either the acid resin or the modified agent or both may be partially decomposed during such modification. For instance, the zinc carbonate may decompose in such a way as to neutralize a portion of the resin acids and form some zinc resinate, in situ, together with some $CO_2$, when the mixture is heated under the conditions described in Example 2. Such inter-reaction between part of the resin and zinc carbonate would decrease the acid value of the modified resin. Likewise, the zinc resinate formed in situ would facilitate a further modification of the resin; it also being a metal salt. In fact, as disclosed in my prior applications, metal salts of organic acids, including metal soaps, are useful as modifying agents in my processes.

On the other hand, some of the resin acids may be decarboxylated during the heating in the presence of the metal salt. Likewise, this would decrease the acid value of the modified resin so obtained. That is, some of the acid groups may be split off during such heating; the acid group being decomposed with formation of $CO_2$ in situ. In fact, I have observed a simultaneous development of $CO_2$ in my processes wherein metal salts other than carbonates are used as the modifying agent. Therefore, apparently a definite decarboxylation occurs during my processes.

And perhaps both of the above mentioned changes occur during these processes. In other words, the reduction in acid value and other modifications obtained may be due in part to a neutralization of some of the resin acids and in part to a decarboxylation of another portion of the acid resin. Also, further changes in the resin may take place. For instance, decarboxylation of part of the rosin would form some oily terpene hydrocarbons and the resulting resinous mixture may consist of an unchanged rosin portion dispersed in an oily terpene hydrocarbon mixture. That is, my modified resin products obtained by the present processes are complex mixtures of various compounds. In any event, they are new isocolloid mixtures.

While I do not fully know the exact mechanisms involved in modifying resins by my processes, I have found that such processes produce modified resin products having improved advantageous properties. And by the present processes, hard resins can be converted into soft resins or liquid resins; the melting point and viscosity of the resin being decreased when so modified. Further, the reduction in viscosity so obtained is also manifest when these soft or liquid resin products are dissolved in volatile organic solvents. That is, the viscosity of their solutions in such solvents is less than of a similar solution of the original resin. This is important in preparing varnishes, lacquers and other liquid coating compositions containing volatile organic solvents.

My modified resins have other advantages in such compositions. For instance, my plastic or liquid resin products yield more elastic films than do the untreated resins, namely, the original resin from which they are prepared. That is, coatings containing such modified resins have improved elasticity as compared with a similar coating containing the original resin.

In the case of lacquers, the elasticity of the film is particularly important. Accordingly, my soft and liquid resin products can be used with advantage in making nitrocellulose lacquers and other lacquers containing cellulose derivatives, such as cellulose esters and ethers, etc., dissolved in a volatile solvent. By incorporating the said resin products in such lacquers containing a soluble cellulose derivative as the primary film-forming ingredient, improved lacquers can be readily obtained.

For instance, nitrocellulose lacquers must contain a plasticizer in addition to the nitrocellulose as a film-forming ingredient. In such lacquers, various liquid plasticizers have been used. When elasticity of the film is improved, it is achieved usually by increasing the proportion of the plasticizer. However, when their proportion is increased over a distinct limit, the liquid plasticizers known in the art cause the coating to be cheesy and unsatisfactory. Below that limit, the flexibility obtained may not be satisfactory. To avoid such difficulties, it has been proposed to use solid plasticizers. For instance, various resins have been used for this purpose. But resinous plasticizers usually do not yield flexible enough films. In general, resins are used to improve the other characteristics of the lacquer and of the lacquer film.

By substituting my soft and liquid resins for the plasticizers previously used, improved lacquers can be readily obtained. Likewise, my modified resin products can be used in conjunction with other plasticizers or resins or both if desired. In the improved lacquers, my soft and liquid resins have several beneficial effects. In addition to being excellent plasticizers, they also become a part of the film-forming constituents in the coatings obtained from such lacquers. Thus, in the improved lacquers, my modified resins serve both as a film-forming ingredient and a plasticizer. They also impart other advantageous properties to the lacquer. In other words, the incorporation of my modified resins in such lacquers gives several valuable advantageous improvements.

The improved lacquers so obtained are advantageous coating compositions. They yield flexible films having satisfactory toughness and good elasticity.

In making such improved lacquers and coatings, various modified resin products may be employed, both those obtained from natural and synthetic resins. And as shown ante, various synthetic resins can be modified by my processes.

And as shown ante, natural resins can be readily converted into soft and liquid resin products. Likewise, resinous esters can be modified to produce valuable modified resins having decreased melting point and viscosity. But in modifying resin esters by the present processes, the degree and rate of liquefaction is usually less than in the case of natural resins and other acid resins. That is, esterified resins are more difficult to modify and convert into soft and liquid resin products.

Thus in making liquid or plastic esterified resins, I may employ two-step methods, instead of directly modifying them. An advantageous and convenient method is to first liquefy the acid resin and then react the modified resin so obtained with the other components of the synthetic resin and thus produce the modified synthetic resin desired. For instance, as stated ante, my modified natural resins are capable of being esterified with glycerine and other polyhydric alcohols. When so esterified and resinified, they yield other valuable modified resin products. The following example is illustrative of such two-step methods of making modified synthetic resins.

*Example 4*

100 parts of the product of Example 2, having an acid value of 80, is heated in a reactor with 5 parts of glycerine to 250° C. and held there for 2 hours at atmospheric pressure, using a reflux condenser to prevent evaporation of volatile ingredients. After the 2 hours are over, vacuum is applied instead of the reflux condenser and the reaction mixture is heated to 280° C. and held there for 1 hour to boil off water and excess of glycerine, besides other volatile ingredients. The resulting product is a plastic resin with improved weathering properties.

The above example illustrates the manufacture of a modified ester gum from my liquefied rosins. Other modified resinous esters can be produced in a similar manner by using other polyhydric alcohols in lieu of the glycerine. Also, in lieu of the liquefied rosin obtained in Example 2, other liquefied rosins may be employed in the method of Example 4.

Likewise my liquefied rosins may be converted into other valuable synthetic resins. For instance, they may be used in making rosin-modified maleic resins and rosin-modified phenolic resins. Such modified synthetic resins may be prepared by substituting the liquefied rosins obtained by the present processes, for the rosin employed in the processes known in the art for making rosin-modified maleic resins and rosin-modified phenolic resins; the processing otherwise being the same as now employed in the art. The liquefied rosin obtained in Example 2, ante, may be used with advantage in such methods of making the said rosin-modified maleic and rosin-modified phenolic resins.

My modified resin products are advantageous in making the so-called "maleic acid resins." The liquefied resin products made according to the present invention contain terpene hydrocarbons containing double bonds in various positions. Therefore, they may be condensed with maleic anhydride to obtain polybasic acids which, in turn, can be converted into other synthetic resins useful in the arts.

The modified resin products obtained as described ante, may be vulcanized as such or in varnish solutions, as described in my prior specifications. Further, they may be converted into emulsions and used in the processes of my prior emulsion patents.

Metal soaps as described in my Patent No. 1,963,065 may be considered as metal salts from the point of view of the present invention, and such metal soaps or salts may be used in the present processes as the modifying agent.

The examples shown ante are illustrating the invention and the latter is not limited to the examples described.

And my generic invention relates to processes for the modification of the physical properties of resinous organic isocolloids, particularly those containing unsaturated carbon compounds, and to the modified organic isocolloid products obtained therefrom.

What I claim is:

1. The process of making a modified and softened rosin product from solid and brittle rosin, which process comprises incorporation in the rosin up to 30% of a metal salt selected from the class consisting of carbonates, sulphides and sulphites of metals selected from the class consisting of magnesium, zinc and the alkaline earth metals and characterized by the ability to develop a gas other than oxygen upon the application of heat during the treatment of the rosin, and heating the mixture out of contact with the atmosphere at a temperature of from 250° C. to 350° C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60.

2. The process of making a modified and softened rosin product from solid and brittle rosin, which process comprises incorporation in the rosin up to 10% of a metal salt selected from the class consisting of carbonates, sulphides and sulphites of metals selected from the class consisting of magnesium, zinc and the alkaline earth metals and characterized by the ability to develop a gas other than oxygen upon the application of heat during the treatment of the rosin, and heating the mixture out of contact with the atmosphere at a temperature of from 250 C. to 350 C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60.

3. A process in accordance with claim 2 wherein the heating is carried out under vacuum.

4. A process in accordance with claim 2 in which the metal salt is a carbonate.

5. A process in accordance with claim 2 in which the metal salt is a sulphide.

6. A process in accordance with claim 2 in which the metal salt is a sulphite.

7. A process in accordance with claim 2 in which the metal salt is zinc carbonate.

8. A process in accordance with claim 2 in which the metal salt is used in an amount up to 5%.

9. The process of making a modified rosin product having drying and film-forming characteristics, which comprises incorporation up to 10% of zinc carbonate in rosin, and heating the mixture out of contact with the atmosphere at a temperature of from 270° C. to 290° C. until the resultant mixture, when cooled, is softened to a consistency between about that of cold flow and about that of viscous oil, the time of treatment further being sufficient to appreciably reduce the acid number of the rosin but not sufficient to lower said acid number to a value below about 60.

10. A process in accordance with claim 9 in which about 5% of zinc carbonate is used.

11. A process in accordance with claim 9 in which the heating is carried out under vacuum.

12. A modified rosin product produced in accordance with the method of claim 2 and having a consistency ranging from about that of cold flow to about that of viscous oil, and an acid value substantially lower than that of the same unmodified rosin, but not below about 60, said product further having melting point and viscosity both appreciably reduced as compared with the same unmodified rosin and having drying and film-forming characteristics.

LÁSZLÓ AUER.

CERTIFICATE OF CORRECTION.

Patent No. 2,311,200.                                          February 16, 1943.

LÁSZLÓ AUER.

It is hereby certified that error appears in the printed specification of the above numbered patent requiring correction as follows: Page 5, first column, line 9, for "Lead carbonate" read --Lead chromate--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.